US008625623B2

(12) United States Patent
Saklecha et al.

(10) Patent No.: US 8,625,623 B2
(45) Date of Patent: *Jan. 7, 2014

(54) METHOD AND SYSTEM TO ALLOCATE EXCHANGE IDENTIFICATIONS FOR FIBRE CHANNEL N_PORT AGGREGATION

(75) Inventors: Bhavi Saklecha, Fremont, CA (US); Kean P. Hurley, Aptos, CA (US); Alfonso Y. Ip, Fremont, CA (US)

(73) Assignee: Broadcom Corporation, Irvine, CA (US)

(*) Notice: Subject to any disclaimer, the term of this patent is extended or adjusted under 35 U.S.C. 154(b) by 175 days.

This patent is subject to a terminal disclaimer.

(21) Appl. No.: 13/021,514

(22) Filed: Feb. 4, 2011

(65) Prior Publication Data

US 2011/0122888 A1 May 26, 2011

Related U.S. Application Data

(63) Continuation of application No. 11/201,107, filed on Aug. 11, 2005, now Pat. No. 7,907,626.

(60) Provisional application No. 60/600,834, filed on Aug. 12, 2004.

(51) Int. Cl.
*H04L 12/28* (2006.01)

(52) U.S. Cl.
USPC .......................................... 370/413; 710/316

(58) Field of Classification Search
USPC ...................... 370/413, 352, 381; 709/245
See application file for complete search history.

(56) References Cited

U.S. PATENT DOCUMENTS

| 6,356,944 | B1 | 3/2002 | McCarty | |
|---|---|---|---|---|
| 6,721,320 | B1 | 4/2004 | Hoglund et al. | |
| 6,801,960 | B1 | 10/2004 | Ericson et al. | |
| 6,847,647 | B1 | 1/2005 | Wrenn | |
| 7,197,047 | B2 | 3/2007 | Latif et al. | |
| 7,307,995 | B1 | 12/2007 | Iyer et al. | |
| 7,460,528 | B1* | 12/2008 | Chamdani et al. | 370/381 |
| 2002/0147843 | A1* | 10/2002 | Rao | 709/245 |
| 2002/0156918 | A1 | 10/2002 | Valdevit et al. | |
| 2003/0091037 | A1 | 5/2003 | Latif et al. | |
| 2003/0198251 | A1 | 10/2003 | Black et al. | |
| 2004/0174867 | A1* | 9/2004 | Nelson et al. | 370/352 |
| 2005/0010735 | A1 | 1/2005 | Ito et al. | |
| 2005/0030954 | A1 | 2/2005 | Dropps et al. | |
| 2005/0052920 | A1 | 3/2005 | Martin et al. | |
| 2005/0080881 | A1 | 4/2005 | Voorhees et al. | |
| 2005/0169188 | A1 | 8/2005 | Cometto et al. | |
| 2005/0243817 | A1 | 11/2005 | Wrenn et al. | |
| 2006/0092932 | A1 | 5/2006 | Ghosh et al. | |

OTHER PUBLICATIONS

Cisco MDS 9000 Family Fabric Manger User's Guide, Cisco Systems, Inc., San Jose, CA, Release 1.2(1a), Sep. 2003, 149 pgs.

* cited by examiner

*Primary Examiner* — Robert Wilson
*Assistant Examiner* — Lionel Preval
(74) *Attorney, Agent, or Firm* — Sterne, Kessler, Goldstein & Fox PLLC

(57) ABSTRACT

A method and system for allocating exchange identifications (IDs) in a fiber channel switch for fiber channel aggregation. The method included determining a number (m) of N_ports present in a back end of the switch, and distributing available exchange IDs across the number (m) of present N_ports. Each exchange ID includes (j) bits and (n) bits are used to identify each of the present backend ports, where $m \leq 2^n$.

20 Claims, 10 Drawing Sheets

METHOD AND SYSTEM TO ALLOCATE EXCHANGE IDENTIFICATIONS FOR FIBRE CHANNEL N_PORT AGGREGATION

CROSS-REFERENCE TO RELATED APPLICATIONS

This application is a Continuation of co-pending U.S. application Ser. No. 11/201,107 filed on Aug. 11, 2005 by SAKLECHA, Bhavi et al., the entire contents of which is incorporated herein by reference and for which priority is claimed under 35 U.S.C. §120. As in the parent U.S. application Ser. No. 11/201,107, this application also claims the benefit of U.S. Provisional Patent Application No. 60/600,834, filed on Aug. 12, 2004, which is incorporated herein by reference in its entirety and for which priority is claimed under 35 U.S.C. §119(e).

BACKGROUND OF THE INVENTION

1. Field of the Invention

The present invention generally relates to a network of devices. More particularly, it relates to an apparatus and system for coupling and decoupling data storage initiator devices to a network without disrupting the network.

2. Related Art

The data storage market includes a number of vendors and products. Unfortunately, integrating various products from different vendors is difficult, and it requires a substantial investment due to a lack of interoperability standards.

In one instance, in order to increase system performance and lower costs, the manufacturers of blade servers and other storage devices are considering integrating a Fibre Channel fabric switch into their devices. However, a blade server with an integrated fabric switch is likely to have difficulties communicating to an external network because of incompatibilities and proprietary features. The conventional wisdom is that such devices are connected using a Fibre Channel E-Port or B-Port topology, thereby allowing fabric related information to be communicated. But, this causes many currently available Fibre Channel fabric switches to be reconfigured to a mode in which proprietary features are turned off and functions are disabled, resulting in a disruption of the network. It is also likely to create network management problems.

What is needed, therefore, are new ways for integrating products from different venders to an existing network that overcome the deficiencies noted above.

BRIEF SUMMARY OF THE INVENTION

Consistent with the principles of the present invention as embodied and broadly described herein, the present invention includes a method and system for allocating exchange identifications (IDs) in a fibre channel switch for fibre channel aggregation. The method included determining a number (m) of N_ports present in a back end of the switch, and distributing available exchange IDs across the number (m) of present N_ports. Each exchange ID includes (j) bits and (n) bits are used to identify each of the present backend ports, where $m \leq 2^n$.

Further features and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and detailed description given below, serve to explain the principles of the invention. In the drawings.

DETAILED DESCRIPTION OF THE INVENTION

Figure 1:
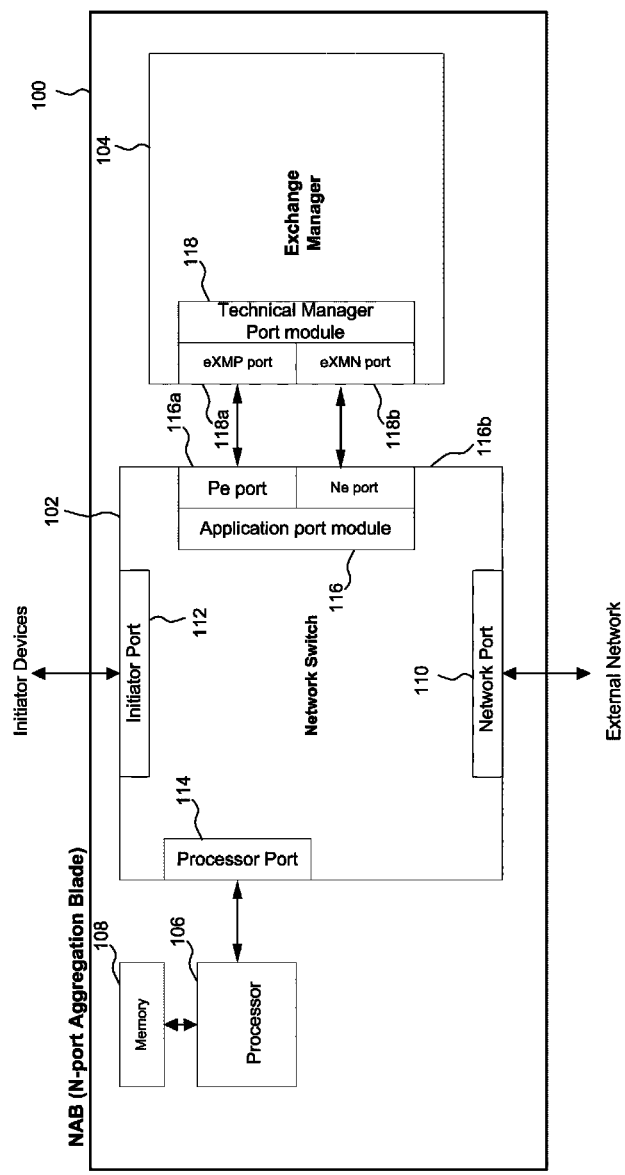
FIG. 1 is a schematic diagram of an example apparatus for coupling and decoupling multiple processing devices to a network according to an embodiment of the invention.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one skilled in the art that the present invention, as described below, may be implemented in many different embodiments of hardware, software, firmware, and/or the entities illustrated in the drawings. For example, embodiments include a tangible computer readable storage medium carrying one or more sequences of one or more instructions for execution by one or more processors. Any actual software code with the specialized, controlled hardware to implement the present invention is not limiting of the present invention. Thus, the operation and behavior of the present invention will be described with the understanding that modifications and variations of the embodiments are possible, given the level of detail presented herein.

FIG. 1 illustrates an example apparatus 100 for coupling and decoupling multiple processing or initiator devices to a network according to an embodiment of the invention. The apparatus 100 includes a network switch 102, an exchange manager 104, a processor 106, and a memory 108.

The network switch 102 includes a network port 110, an initiator port 112, and a processor port 114. The network port 110 is configured for coupling to an external network. The initiator port 112 is configured for coupling to multiple processing or initiator devices such as, for example, server blades. The processor port 114 couples the network switch 102 to the processor 106.

In an embodiment, the apparatus 100 operates in a loop topology mode referred to herein as NL_PORT mode. In this mode, the apparatus 100 connects to an external network such as, for example, a Fibre Channel fabric via the network port 110 such that the network port 110 operates as an NL_PORT, as defined in the Fibre Channel standards. As will be understood by persons skilled in the relevant art(s), an NL_PORT is a specialized loop port topology optimized to pass data traffic efficiently to a connected FL_PORT on a fabric switch. More details about this mode of operation are provided below.

In another embodiment, the apparatus 100 operates in a non-loop mode referred to herein as N_PORT mode. In this mode, the apparatus 100 connects to an external network such as, for example, a Fibre Channel fabric via the network port 110 such that the network port 110 operates as an N_PORT as defined in the Fibre Channel standards.

It is a feature of the apparatus 100 that selected portions can be formed using commercially available hardware. For example, in an embodiment, the network switch 102 is a commercially available network switch such as, for example, Broadcom Corporation's BCM8440 Fibre Channel fabric switch, available from Broadcom Corporation, Irvine Calif. The processor 106 can be formed using a MIPS processing core available from MIPS Technologies, Inc., Mountain View Calif.

The exchange manager 104 is responsible for proper translation of Fibre Channel communication exchanges for all fiber channel protocol (FCP) frames that are routed to an eXM port 118a and an eXM port 118b of exchange manager port module 118. As shown in FIG. 1, the eXM port 118a and eXM port 118b are respectively coupled to Pe port 116a and Ne port 116b of application port module 116. In an embodiment of the present invention, the exchange manager 104 is implemented as a field programmable gate array (FPGA) device. The present invention, however, is not restricted to this implementation.

Figure 2:
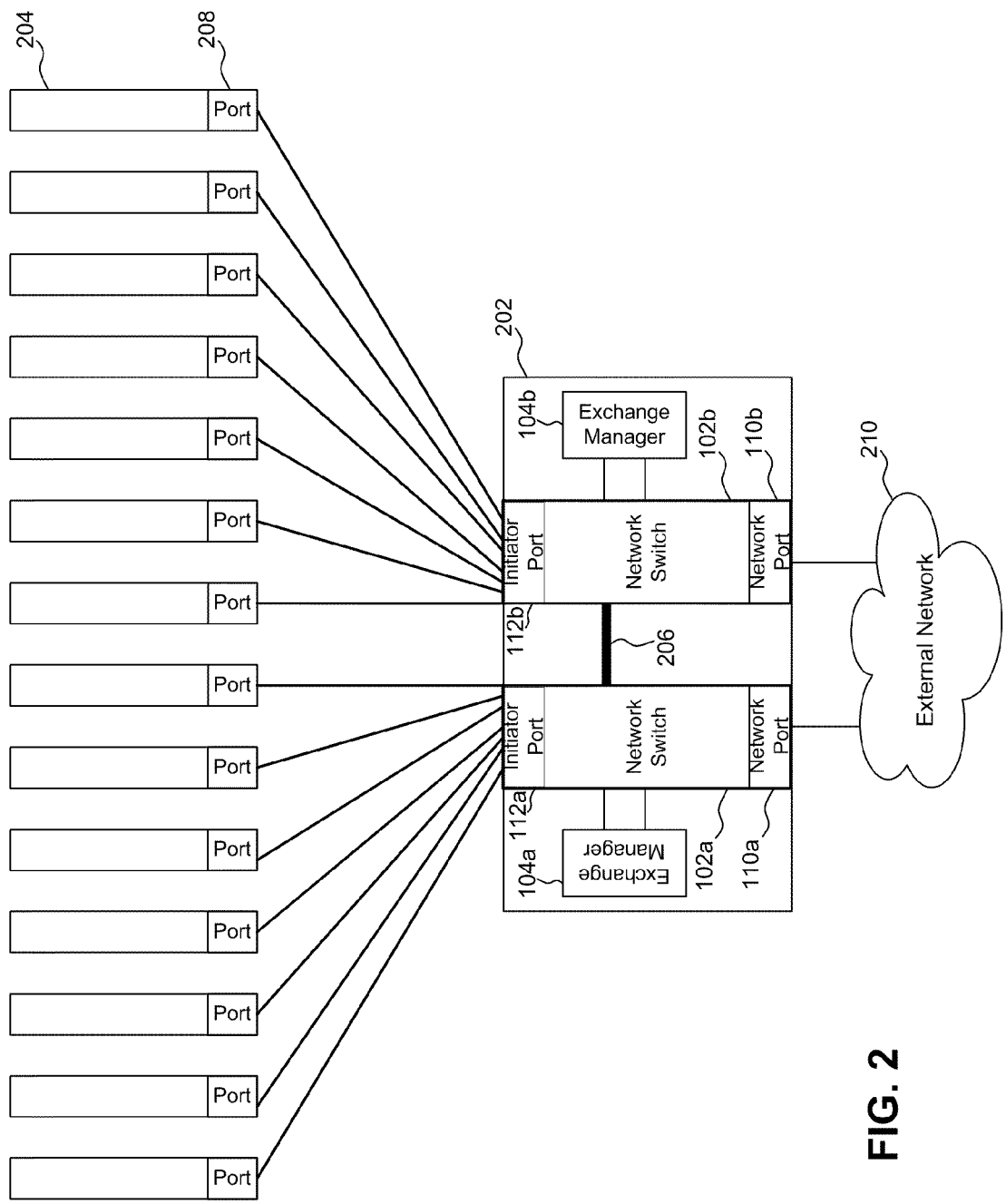
FIG. 2 is a schematic diagram of an example system according to an embodiment of the invention.

FIG. 2 illustrates an example system 200 according to an embodiment of the invention. The system 200 includes an aggregator circuit 202 and a plurality of initiator devices 204. The aggregator circuit 202 couples the initiator devices 204 to an external network 210.

As shown in FIG. 2, the aggregator circuit 202 includes two network switches 102a and 102b. The network switches 102a and 102b each have a network port 110 and an initiator port 112. In an embodiment, each network switch 102 operates in NL_PORT mode and each network port 110 operates as an NL_PORT as defined in the Fibre Channel standards. In an embodiment, the network switches 102a and 102b are coupled to one another by an inter-switch communications link 206.

The initiator devices 204 each include a port 208, implemented as an N_PORT in an embodiment, in accordance with Fibre channel standards. The port 208 is used to couple an initiator device 204 to an initiator port 112 of the network switch 102. In the embodiment, the initiator devices 204 are Fibre Channel Protocol-Small Computer System Interface (FCP-SCSI) initiator devices, and the initiator port 112 includes a plurality of FC-FS2 point-to-point ports for connecting to FCP-SCSI initiator devices.

As noted above, in embodiments of the present invention, the network switches 102 of the apparatus 100 and the system 200 are fabric switches, which operate in an NL_PORT mode. This is a specialized Fibre Channel switch architecture mode, in which the network ports 110 operate as FC-AL2 loop ports (referred to herein as NL_PORTs), configured for coupling to an external network, and the initiator ports 112 operate as FC-FS2 point-to-point ports (referred to herein as N-ph_PORTs), configured to couple to FCP-SCSI initiator devices. The network ports 110 and the initiator ports 112 are coupled together through a buffered non-blocking switch backplane.

In NL_PORT mode, input/output (I/O) frame traffic from an initiator device 204 is routed through its associated initiator port 112 of the network switch 102 to the network port 110. The network port 110 routes ingress frames through the initiator port 112 to an appropriate initiator device 204 based on the arbitrated loop physical address (ALPA) component of a DID.

In N_PORT mode, the apparatus 100 acts as an N_PORT aggregator blade (NAB). In the N_PORT mode, input/output (I/O) frame traffic from an appropriate initiator device 204 is routed through its associated initiator port 112 of the network switch 102, through the exchange manager 104, to the network port 110. The network port 110 routes ingress frames through the initiator port 112, through the exchange manager 104 to an appropriate initiator device 204 based on point-to-point Fibre channel topology standards.

The basic requirement of the NAB 100 is to replace the Port address and world wide name (WWN) of each of the FCP-SCSI initiator devices 204 with a Port address of the NAB N-ph PORTs of the initiator ports 112a and 112b. In this manner, the external network (fabric) 210 will only see the N_PORT of the NAB 100.

In order to replace the Port address and WWN of the FCP-SCSI initiator devices 204 with the Port address of the NAB N-ph PORTs 112a and 112b, the Fibre Channel Exchange protocol requires that for a given SID (internal SCSI Initiator in this case) the originator exchange identifier (OX_ID) should not be duplicated. In conventional systems, this requirement is significant because it is likely that each of the SCSI Initiator devices 204 will be using the same OX_ID. This is especially true, for example, when the SCSI Initiator devices 204 are manufactured by the same vendor. Thus, it is necessary to replace the Port addresses and WWNs to prevent duplication.

In order to provide a unique OX_ID for each communication exchange generated by each of the SCSI Initiator devices 204, the NAB 100 desirably monitors the exchange and performs replacements at the Login level and Exchange level of the Fibre Channel protocol.

Figure 3:
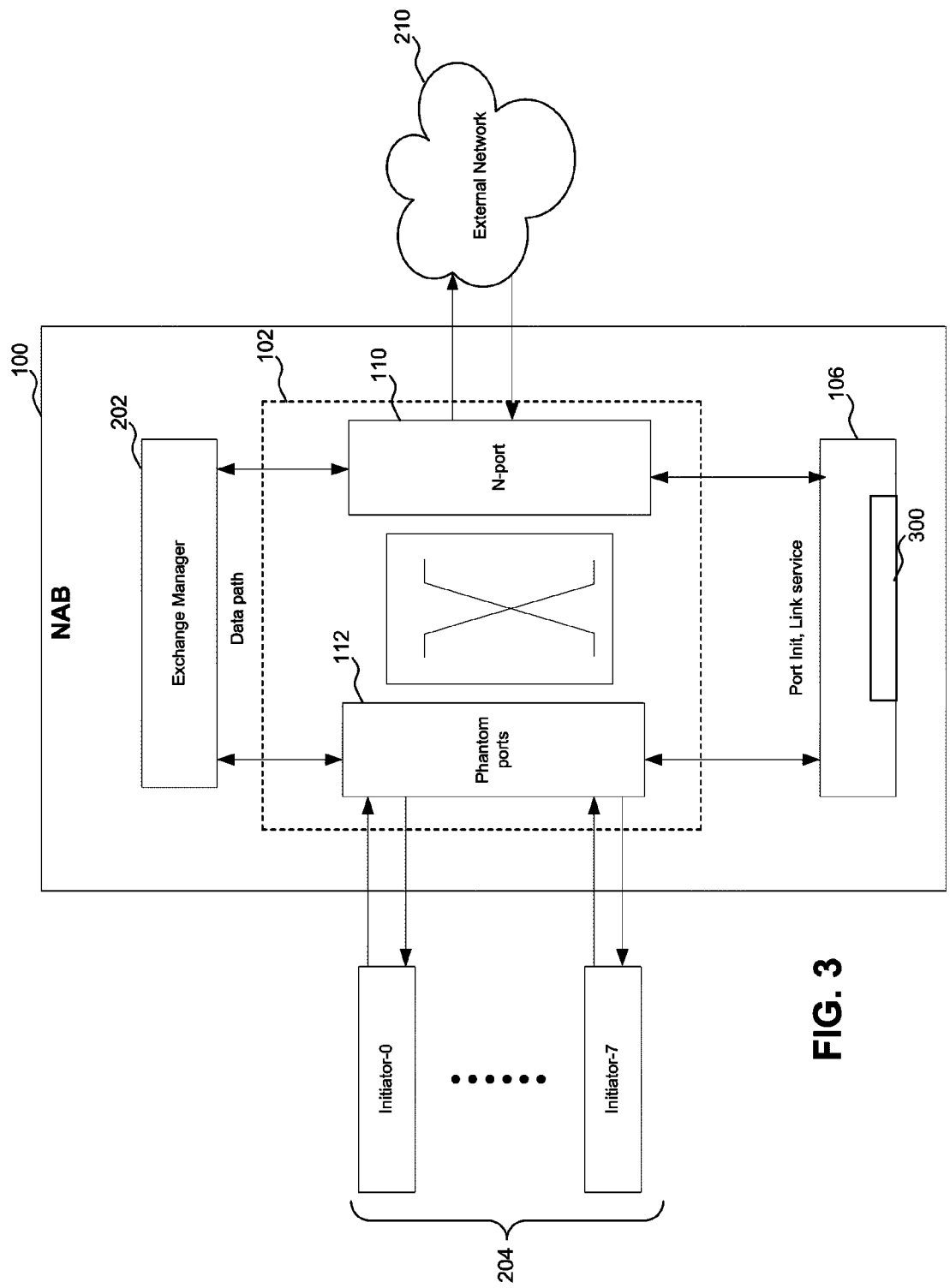
FIG. 3 is a block diagram illustration of an embodiment of the present invention configured for operation as an N_PORT Mode Model.

FIG. 3 is a more detailed illustration of the NAB 100 shown in FIG. 1. The NAB 100 shown in FIG. 3 is configured for operation in N_PORT mode. In FIG. 3, as noted above, the NAB 100 includes the network switch 102 and the exchange manager 104. When configured for operation in N_PORT mode, the initiator port 112 operates as multiple phantom ports and the network port 110 operates as an N_PORT. Firmware operating internal to the processor 106 of FIG. 1, forms an NAB management agent 300.

The network switch 102, for example, provides the DID routing and extended link services (ELS) filtering capabilities. The processor 106, for example, provides the Link Services, Name server and all the ELS processing for the NAB 100. All of the ELS type of frames for Fibre Channel related exchange session management will be handled by the NAB Management Agent 300.

A frame received by one of the Phantom ports 112 is routed by the network switch 102. The network switch 102 determines whether the frame is to be routed to the exchange manager 104, the processor 106, or to the N_PORT 110.

Similarly, a frame received at the N_PORT 110 will be routed by the network switch 102 to the exchange manager 104, the processor 106, or to one of the Phantom ports 112.

Frames routed to the exchange manager 104 will undergo address translation before being sent back to one of the Phantom ports 112. Frames sent to the processor 106 are primarily for Link management and for ELS management. Frames can be sent directly between any one of the Phantom ports 112 and the N_PORT 110 if the NAB 100 is configured to have an E_PORT or NL_PORT, instead of N_PORT, connection into the external network 210.

The ELS and other Fabric management frames are handled within the NAB Management Agent 300. The NAB management agent 300 receives ELS frames that have been filtered by the network switch 102. In the present invention, for example, these frames will not be sent to the exchange manager 104. The network switch 102 will route the ELS frames to the processor 106. The NAB Management Agent will 300 be responsible for all the address translation for these frames and is configured to receive ELS frames from the Phantom ports 112 and from the N_PORT 110.

After a Fabric Login session, and when the NAB 100 is connected to an F_PORT, the ID of the Network Port 110 will not be a default value. In this case the external network 210 (Fibre channel Fabric), for example, will assign an address for the network Port 110 (N_PORT) to the NAB 100 during the Fabric Login process at the network Port 110 side.

Similarly, on the Phantom port side of the NAB 100, the Initiators 204 will Login to the Phantom ports 112. The Phantom ports 112 will appear to the Initiator ports 208 as F_PORTs and the Initiators 204 will, themselves, login as N_PORT devices. The Initiator ports 208 will be assigned Port IDs by the NAB Management Agent 300.

The Port ID assignment is performed using arbitrated physical loop address (ALPA). During this process, the Initiator ports 208 will be assigned ALPAs starting from 0x01 through 0x0F. ALPA 0x00 is desirably reserved for the processor port 114 (see FIG. 1). The network switch 102 ports connected as Phantom ports and as an Ne_PORT (e.g. the port 116*b* of FIG. 1), will be programmed for ALPA based routing. The network switch 102 ports connected as N_PORT and as Pe_PORT (e.g., the port 116*a*) will be programmed for Area based routing.

Figure 4:
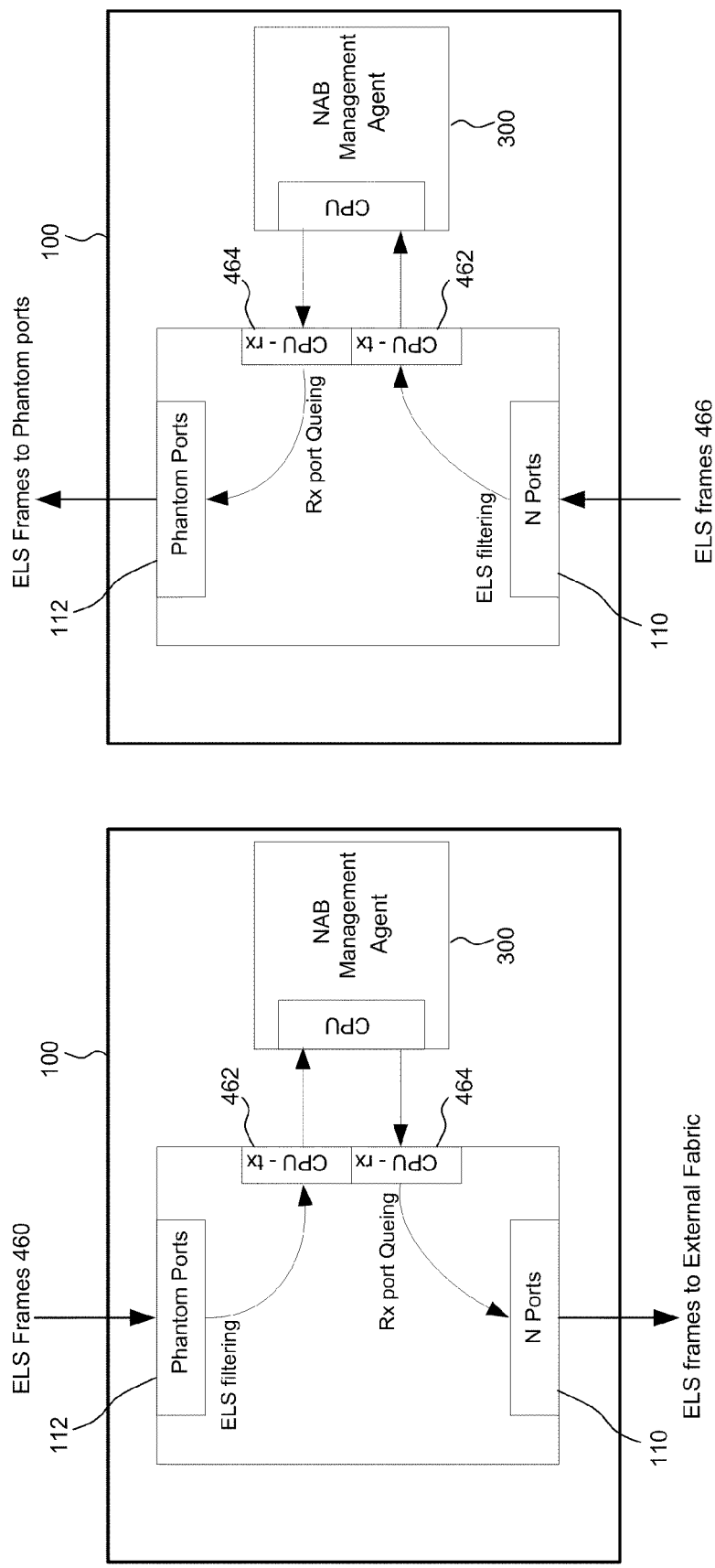
FIG. 4 is block diagram illustration of extended link service frame flow in accordance with an embodiment of the present invention.

FIG. 4 provides an illustration of ELS frame mapping, as implemented in an embodiment of the present invention. As shown in FIG. 4, ELS frames 460 originating with the Initiators 204 are filtered by the Phantom ports 112 of the network switch 102, and then routed to the processor port 114. Next, the NAB Management Agent 300 will be interrupted and will read out the ELS frame from a CPU TX port 462. After the ELS frame has been modified by the NAB Management Agent 300, it can be written back into a CPU RX port 464 and queued to the proper RX queue for the N_PORT 110. The final modified ELS frame will subsequently be sent to the N_PORT 110.

Similarly, ELS frames 466 originating with the External network 210 are filtered at the N_PORT 110 of the network switch 102 and then routed through the CPU TX and RX ports 464 and 462. The NAB Management agent 300 can then send the ELS frames 466 to one or more of the Phantom ports 112.

Figure 5:
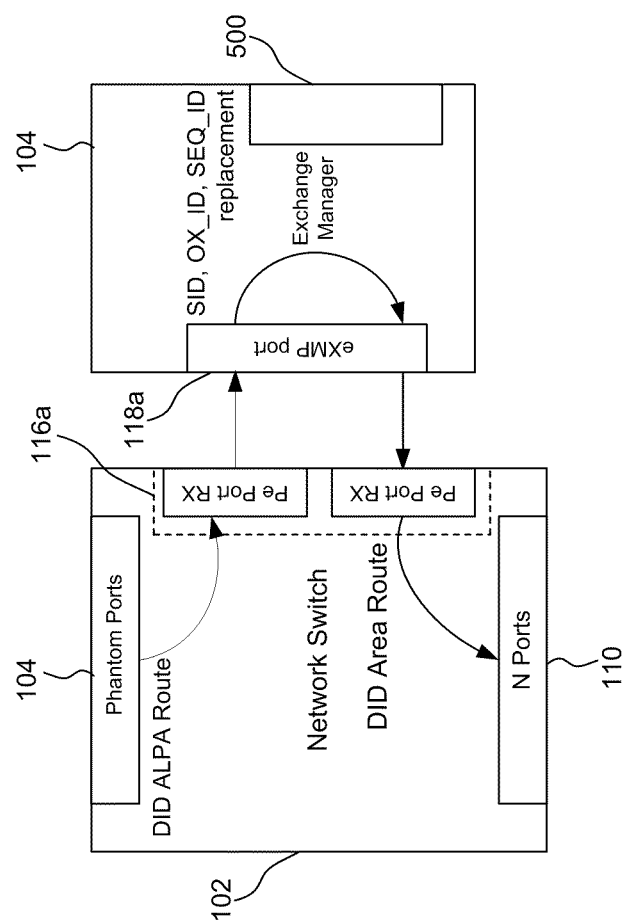
FIG. 5 is a block diagram illustration of a phantom port to N_PORT data path in accordance with an embodiment of the present invention.

FIG. 5 is an illustration of phantom port to N_PORT mapping, as implemented in an embodiment of the present invention. In FIG. 5, a translate IO (exchange) is originated by a particular one of the initiators 204. The particular Initiator sends, for example, a Fibre Channel Protocol command (FCP_CMND) frame whose destination is a DID that needs to be routed through NAB 100. The exchange manager 104 receives the frame on the eXM-p Port 118*a* and performs the necessary address replacements to the FCP_CMD frame.

The exchange manager 104 will process the command frame and create a Phantom port 112 to N_PORT 110 mapping for that exchange. The exchange manager 104 will also create a new entry in an internal IO table 500, corresponding to this exchange. The exchange manager 104 will replace the SID of the particular one of the Initiators 204 with the SID of the address of the N_PORT 110.

Figure 6:
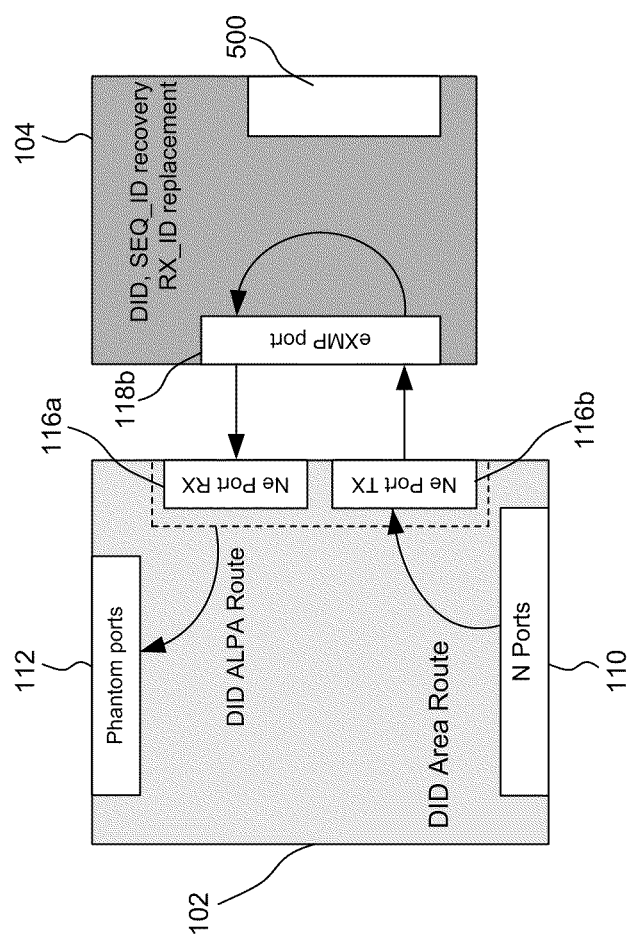
FIG. 6 is a block diagram illustration of an N_PORT to phantom port data path in accordance with an embodiment of the present invention.

As illustrated in FIG. 6, the exchange manager 104 then creates a new FCP_CMND frame, forwarding the new FCP_CMND frame to the network switch 102 N-pe Port 116*b*. Subsequent frames for that exchange are received by exchange manager 104 and handled as specified by its corresponding IO table entry.

The corresponding response frame from a Target communicating with the particular one of the Initiators 204 (see FIG. 3) via the external network 210, for example, will be received at the N_PORT 110 of network switch 102. The response frame will then be routed through the Ne Port 116*b* to the eXMN Port 118*b* of the exchange manager 104. The frame is looked up in an IO table 500 entry that is related to the exchange and the necessary address replacements are made to the response frame. The exchange manager 104 will replace the DID of the frame with the DID of the particular one of the initiators 204. This frame will now be sent to the Ne port 116*a*. The network switch 102 can now route this frame to the appropriate Phantom port 112 that corresponds to the particular one of the initiators 204.

In order to do a proper translation of exchanges and Fibre Channel frame sequences, the exchange manager 104 will desirably track an Exchange Begin, Exchange End, Sequence begin, Sequence end and the type of FCP command. For proper Exchange translation for an N_PORT device, the Sequence ID will desirably be transposed so that SEQ_ID reuse is maintained as defined, for example, in Fibre Channel_FS-2.

Figure 7:
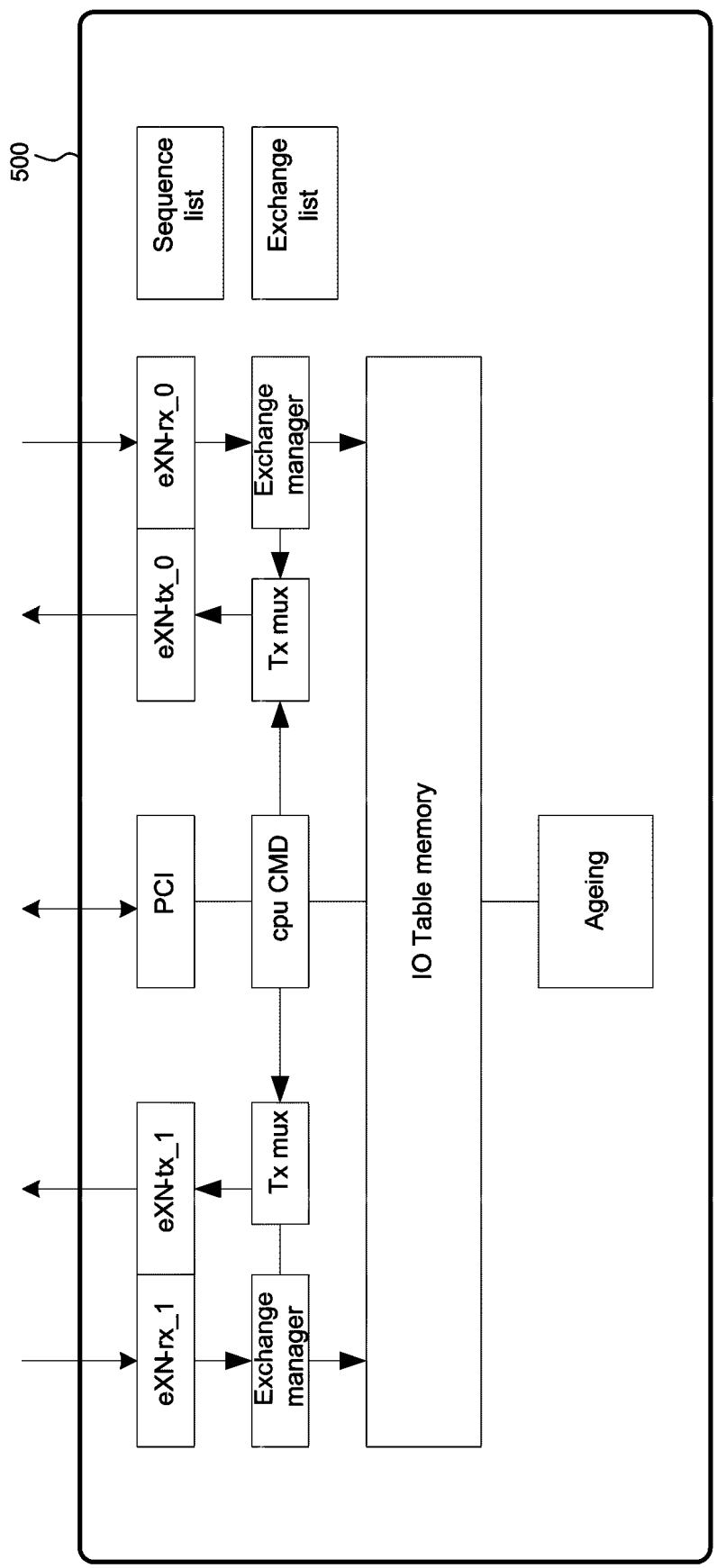
FIG. 7 is a block diagram illustration of an exemplary IO table in accordance with an embodiment of the present invention.

FIG. 7 is an illustration of an exemplary IO table 500 arrangement. When the exchange manager 104 receives the first Exchange from an exchange originator, such as one of the initiators 204, it identifies the exchange and creates a new entry in the IO table 500. This provides the exchange manager 104 a starting point for tracking subsequent frames of the exchange. The SID, OX_ID, and SEQ_ID of the first Exchange frame is replaced with the aSID (SID of the NAB N_PORT SID), aOX_ID (the new OX_ID generated by the eXM), and the a_SEQ_ID (new SEQ_ID generated by the exchange manager 104).

When a Responder sends the first response frame having the same aOX_ID, the exchange manager 104 performs an IO Table 500 look up using the aOX_ID as an index. The exchange manager 104 will then retrieve the original SID, OX_ID and the SEQ_ID and replace those fields. Additionally, it will save the responder exchange identifier (RX_ID) in the IO table 500 and replace the RX_ID of the response frame with a new aRX_ID. To simplify this process, the exchange manager 104 will use the same value of the aOX_ID. For subsequent frames from the originator, the IO table 500 will be indexed by the aRX_ID of the frame.

By simplifying the process as noted above, simpler memory schemes can be used to index into the IO table entries. An exemplary technique for indexing the IO table 500 might include the First Exchange frame creating a new entry using the aOX_ID as the index. For frames from the responder, the aOX_ID is used as the index, and any subsequent Initiator frames can use the aRX_ID.

Figure 8:
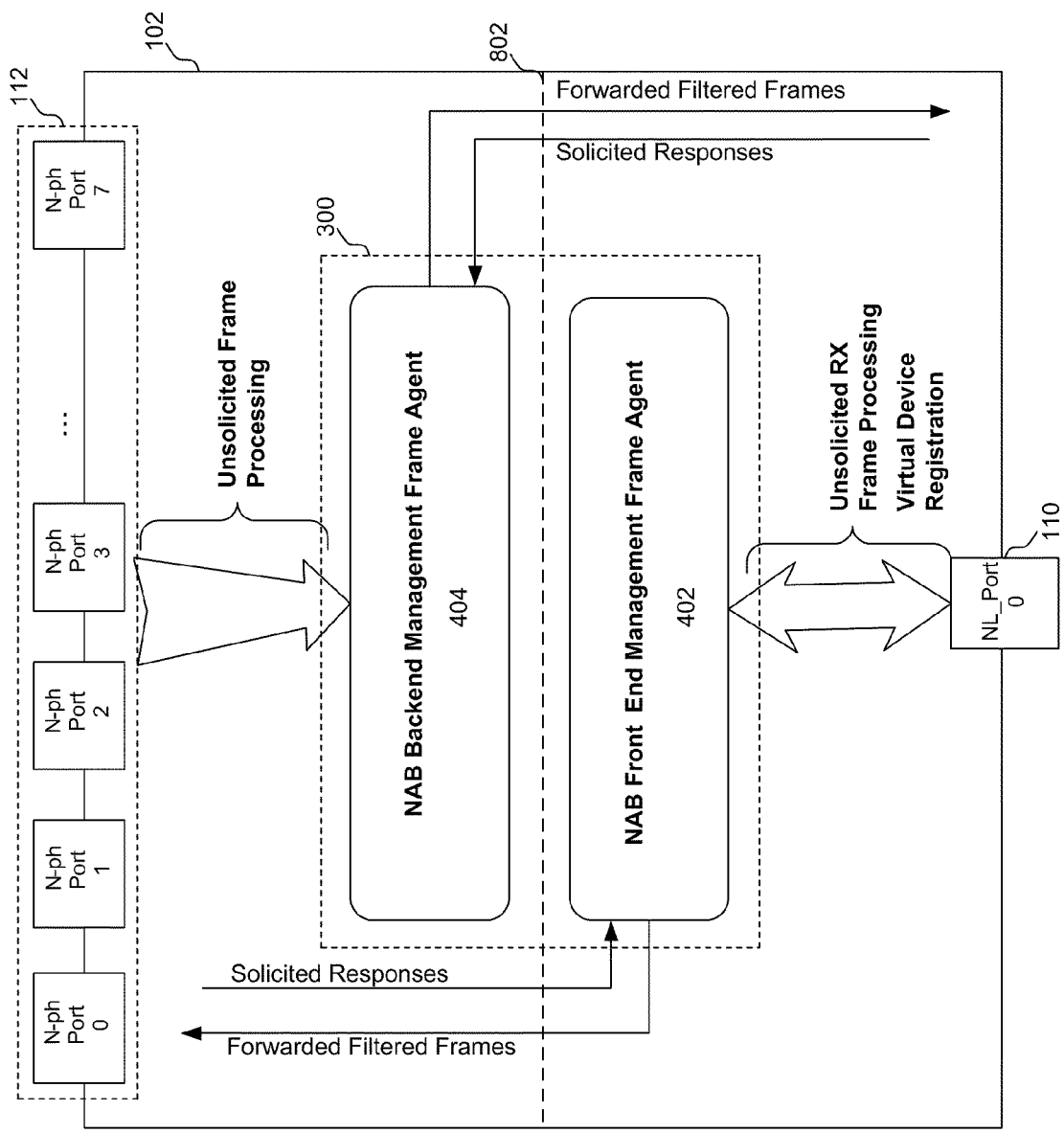
FIG. 8 is a schematic diagram illustrating operation of a management agent and routing of frame traffic according to an embodiment of the present invention.

FIG. 8 illustrates how one can think of the apparatus 100 as having a dividing line 802 at the midsection of network switch 102, which separates network port 110 from initiator port 112.

As shown in FIG. 8, management frame processing is different for the different port types. Accordingly, management agent 300 can be thought of as including a front-end management agent 402 and a back-end management agent 404. The front-end management agent 402 performs operations relating to specific tasks associated with the network port 110. The back-end management agent 404 performs operations relating to specific tasks associated with the initiator port 112. These specific tasks include handling unsolicited management request frames from the network port 110 and the initiator port 112. Depending on processing logic, these frames may be filtered and forwarded, or the frames may be processed directly by the management agent and a management response returned.

In embodiments of the present invention, the management agent 300 is responsible for one or more of the following tasks:

1. Forwarding non-disruptive (query/get) oriented management frames from the initiator port 112 (i.e., the N-ph_PORTs) to the network port 110;

2. Re-mapping back-end N-ph_PORT network provider identification (NPID) and world wide port name (WWPN) parameter field values to fixed NPID and WWPN values in all management frames;

3. Internally processing and replying to registration oriented management frames issued from initiator devices coupled to the initiator port 112;

4. Performing device registration for initiator devices coupled to network port 110; and 5. Hiding back-end initiator port connection oriented events (port up/port down) from the external network 210 (e.g., the back-end ports should be considered I/O processing engines, and the addition or removal of these back-end ports should be isolated from the front-end port and the external network).

The front-end management agent 402 is responsible for management frame processing related to the network port 110. For example, the front-end management agent 402 processes port initialization and initiates device registration for the network port 110. In the present invention, the scope of frame processing is the full required protocol coverage of ELS and Name Server frames mentioned in Fibre Channel-FLA 2.7.

The front-end management agent 402 assigns a unique static WWPN/WWNN for each network port 110 (and each ALPA in NL_PORT mode). The WWPN remains fixed and static irregardless of the actual initiator devices connected to the back-end N-ph_PORTs. Front-end management agent 402 also is responsible for processing all unsolicited ELS and Fabric Service frames sent from a fabric.

In embodiments, front-end management agent 402 is responsible for processing one or more of the following:

1. Network port Initialization;
2. Device registration with a network controller (e.g., FLOGI);
3. Device registration with Name Server (NS set operations);
4. Rx RCSN forwarding and fan-out to back-end N-ph_PORTs (exchange cleanup handling);
5. Rx generic ELS processing;
6. Proxy agent probing;
7. Rx unsolicited FCP-SCSI discovery command(s);
8. SCSI Inquiries; and
9. Vital product data page information.

The front-end management agent 402 performs port initialization for each front-end port, for example, in the system 202. In an embodiment, the network port initializes using Fibre Channel-AL2 loop protocol in NL_PORT mode. The back-end ports (N-ph PORTs) associated with the front-end ports are affected by the port-up and port-down events occurring on the front-end network ports. When a front-end network port 110 goes down, it forces each associated N-ph_PORT into an offline state, for example, by sending NOS continuously to all associated N-ph PORTs.

When the network port 110 returns to proper operation, it completes name server and fabric logic services, and it allows associated N-ph ports to come on line. Back-end management agent 404 assigns port IDs to the N-ph_PORTs and sends accept responses to N-ph port registration requests. Initiators devices on the N-ph PORTs as part of the target discovery process send PLOGIs to target devices. Back-end management agent 404 processes the PLOGIs (modified WWNN and WWPN) and forwards them to each target.

The front-end management agent 402 sources fabric logic (FLOGI) requests for each front-end N_PORT (or for each ALPA exposed on an NL_PORT). A fixed WWPN/WWNN is used for these devices. The public address domain and areas components (e.g., DDAA[XX]) returned from the fabric assigned to the front-end port in the FLOGI accept frame is used for associated back-end ports. Back-end management agent 404 uses this internally recorded address identifier (DDAAXX) for back-end N-ph_PORT FLOGI response processing. Registration for state change notification(s) is performed for each ALPA exposed on an NL_PORT using a storage resource card (SRC) protocol.

The front-end management agent 402 also sources non-stop (NS) registration frames for each front-end ALPA exposed on an NL_PORT. This includes registration of Fibre Channel-4 types RFT_ID, device port id RPN_ID (fixed WWPN value), device port name RNN_ID, device node name: RSNN_NN (fixed WWNN assigned value), and the symbolic port name RSPN_ID. Registration is performed for each NL_PORT exposed to the external network.

The front-end management agent 402 is responsible for receiving and processing unsolicited RSCN request frames from a fabric controller for each front-end NL_PORT. The front-end management agent 402 replicates registered state change notification (RSCN) events and forwards the appropriate data to associated back-end N-ph_PORTs.

The front-end management agent 402 receives and processing unsolicited ELS frames for FCP-SCSI initiator devices, for example, according to the Fibre Channel-FLA 2.7 standard. The frames/requests are directly processed and returned by the front-end management agent 402. The responses return information defining a FCP-SCSI initiator, and no interaction with back-end management agent is required. In embodiments, front-end management agent 402 support the following ELS frames as ELS Responder: ADISC, FAN, PLOGO, PDISC, PLOGI, PRLI, PRLO, RNC, RRQ, RSCN. In selected embodiments, the following ELS frames also are supported: ABTX, RES, RLS, RSI, RSS, SCN, SCR, TPRLO.

Many fabric switch devices have proxy discovery agents that probe edge devices in order to help populate the Name Server database. These devices can source ELS requests to the network port 110. The front-end management agent 402 satisfies requests for information from these devices about the network port 110.

The front-end management agent 402 receives and processes unsolicited FCP-SCSI discovery commands. These requests also are processed and returned by the front-end management agent 402, returning information defining a FCP-SCSI initiator, without interaction with the back-end management agent 404. The following FCP-SCSI FCP commands are supported: Test Unit Ready, Inquiry-Standard, and Inquiry-Vital Product Data. The Vital Product Data page returns the WWPN/WWNN of network port 110.

The back-end management agent 404 is responsible for management frame processing related to the N-ph_PORTs (initiator port 112) connected to back-end FCP-initiator devices. The back-end management agent 404 processes port initializations and replies to device registration requests for the N-ph_PORTs. The internal behavior of back-end management agent 404 allows initiator devices to operate as if they were directly connected to the external network (e.g., Fabric Switch) coupled to the network port 110.

In N_PORT mode, each initiator device coupled to an N-ph_PORT can operate as if it were the only device coupled to the network port 110. This is accomplished by specialized forwarding and filtering of ELS and Fabric Services frames, as illustrated in FIG. 8. Fabric controller and name server registration is isolated and hidden from the external network/connected fabric. General WWPN re-mapping to a fixed WWPN (related to network port 110) occurs for ELS and Fabric Service frames sourced by back-end ports.

The back-end management agent 404 is responsible for processing/performing one or more of the following:
1. Port Initialization (N-ph_PORTs);
2. Unsolicited ELS/Fabric Service frames required for FCP-SCSI initiators by
  Fibre Channel-FLA 2.7;
3. Fabric Control FLOGI frame requests;
4. Name Server registrations; and
5. Name Server queries.

The back-end management agent 404 performs port initialization for each back-end N-ph PORT. The ports initialize using Fibre Channel-FS point-to-point protocol. The back-end N-ph PORTs are only allowed to become "active" ports after their associated front-end network port 110 has been initialized and achieved an active state. At this point, an N-ph PORT sends name server registration and fabric login requests to the back-end management agent 404. The back-end management agent 404 assigns a port ID to the N-ph_PORT and sends accept responses to registration requests. An initiator device on the N-ph PORT then sends a PLOGI. Back-end management agent 404 filters the PLOGI WWNN/WWPN and forwards it. The back-end management agent 404 captures and processes the PLOGI ELS_ACC frame from the target and forwards it to the N-ph_PORT.

All ELS and Fabric Service unsolicited requests sourced from back-end ports are received and processed by the back-end management agent 404. In general, both the unsolicited requests and solicited responses are NPID/WWPN/WWNN filtered as follows:
1. The unsolicited requests from N-ph_PORTs (which are forwarded to the fabric) have the N-ph_PORT initiators true NPID/WWPN/WWNN remapped to the associated network port 110 device NPID/WWPN/WWNN; and
2. The solicited response frames returned from the fabric have the network port 110 NPID/WWPN/WWNN remapped to the N-ph_PORT initiators actual NPID/WWPN/WWNN.

Specialized handling of specific ELS/Fabric Service unsolicited requested are described in more below.

The back-end management agent 404 is responsible for receiving and responding to all FLOGI frames generated by N-ph_PORT devices. These requests are directly processed and returned by back-end management agent 404.

Internal checking/processing is performed on the FLOGI service parameters requested by each N-ph_PORT initiator device. The requested service parameters must be supported by the FLOGI service parameters negotiated by the associated frond-end network port device, and they are returned based on the negotiated front-end port service parameters.

The NPID assigned to the each back-end port is based on the domain and area (DDAA--) address components assigned to the associated front-end network port. The ALPA/device component of the address (----XX) maps to fixed ALPA addresses assigned to each back-end N-ph_PORT.

Returned link level negotiated values such as BBC, are processed based on the local link resources of the N-ph_PORT.

The back-end management agent 404 also processes Fabric Service Name Server Registrations sourced from back-end N-ph_PORTs. These registration requests are terminated and acknowledge directly by the back-end management agent 404. They are not forwarded to the Fabric as it is an objective of the present invention to hide or to virtualize the actual back-end initiators. All unsolicited Name Service registrations requests (0xX2XX type match) are acknowledge without the requirement for establishing and maintaining a local database.

Also as illustrated in FIG. 8, the back-end management agent 404 forwards Fabric Service Name Server Query/Get requests (0xX1XX type match) sourced from back-end N-ph_ PORT. These registration requests are forward through the associated network port 110. The frames are filtered, and references to NPID or WWPN/WWNN are replaced as described above.

Frame filtering is performed on unsolicited requests forwarded to the external network/fabric such that N-ph_PORT id/name data are changed to the appropriate network port 110 id/name data. Frame filtering is performed on the solicited responses returned from the external network/fabric such that the network port 110 id/name data are changed to the appropriate N-ph_PORT id/name data. These query operations are non-disruptive to the external network/fabric, and hence the forwarded protocol has no or minimal impact on external network/Fabric state or I/O data paths.

In NL_PORT mode, registered state change notification (RSCN) frames are directly forwarded to the back-end N-ph_PORTs, such as the ports 208.

In the Fibre Channel N_Port aggregation application, one front end N port connected to a fabric would aggregate traffic from the backend N ports 208. Each the N port 110 is allowed to have up to 64 K open exchanges in the fibre channel protocol. The front end N port 110 would then allocate its 64 K exchange IDs (on the fabric connection) among the back-end N ports 208. As an example, the exchange ID can be a 16 bit entity. To distribute the 64 K exchange IDs among (m) number of the backend N ports 208, n bits, where $m<=2^n$, will be needed to identify the backend N ports 208. The (n) most significant bits of the exchange ID are used to identify a particular one backend N ports 208; and the remaining (16-n) bits will represent a consecutive range of exchange IDs.

For example, for 8 backend ports, each backend port gets 8 K of the front end exchange IDs. The invention is not limited to any particular number of ports.

Fibre Channel standard FC-FS-2 specifies that an N port could have up to 64 K exchanges. When a front end N port is used to aggregate traffic for multiple backend N ports, it is necessary to limit the number of exchanges that each backend N port could open.

The ability to confine the number of exchanges on the front end N port to 64 K enables the front end N port to aggregate traffic from multiple back end N ports; and to be compliant with established Fibre Channel Standards, which is an advantage over conventional means.

The approach can be modified and made applicable to allocate exchange IDs unevenly to favor selected backend N ports if the application warrants the uneven distribution. The modification is accomplished by allocating exchange IDs among x ports, where x is not a multiple of 2.

Figure 9:
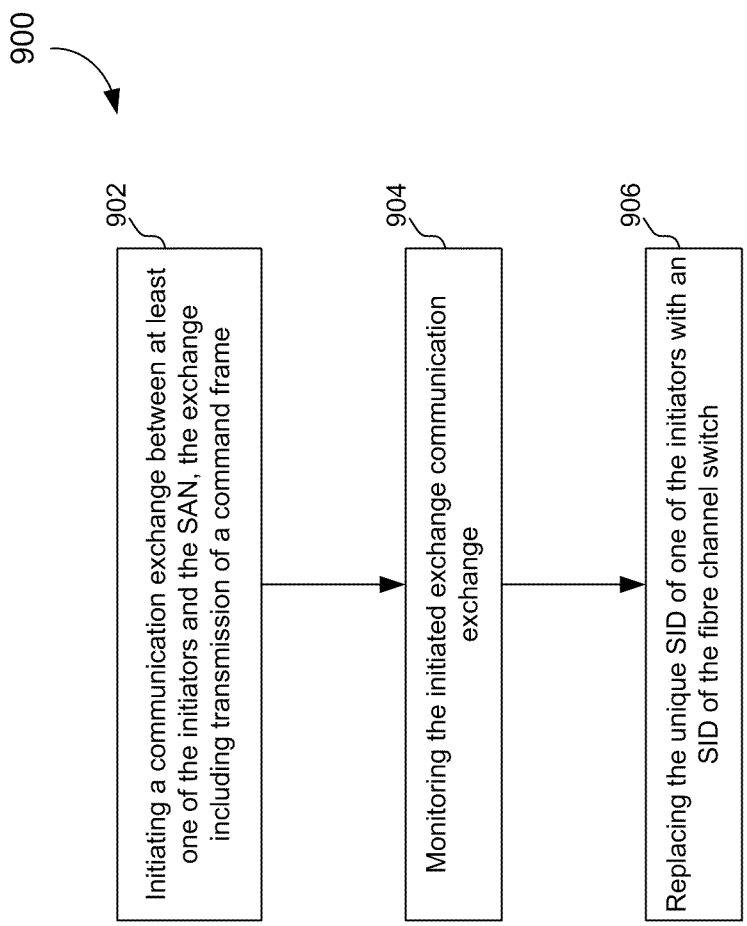
FIG. 9 is a flow diagram of an exemplary method of practicing a first aspect of an embodiment of the present invention.

FIG. 9 is an illustration of an exemplary method 900 of practicing a first aspect of an embodiment of the present invention. In FIG. 9, a communication exchange is initiated between at least one initiator and a SAN, the exchange including transmission of a command frame, as indicated in step 902. In step 904, the exchange is monitored. And in step 906, the unique SD of one of the initiators is replaced with an SID of the Fibre channel switch.

Figure 10:
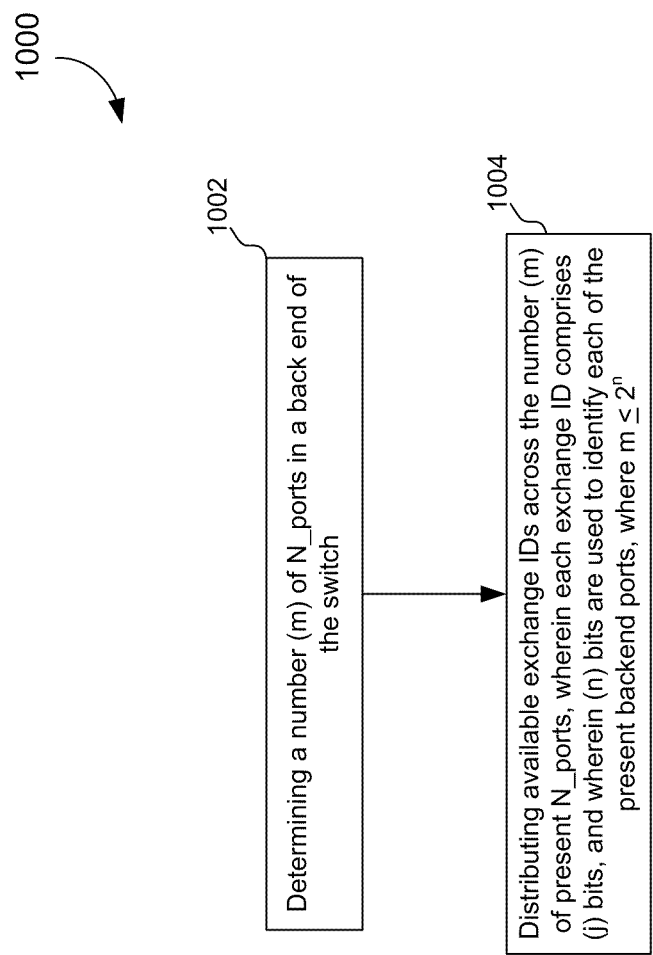
FIG. 10 is a flow diagram of an exemplary method of practicing a second aspect of an embodiment of the present invention.

FIG. 10 is an illustration of an exemplary method 1000 of practicing a second aspect of an embodiment of the present invention. In FIG. 10, a number (m) of N_ports present in a back end of the switch is determined, as indicated in step 1002. And in step 1004, the available exchange IDs are distributed across the number (m) of present N_ports. Each exchange ID comprises (j) bits, and (n) bits are used to identify each of the present backend ports, where $m \leq 2^n$.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination of one of ordinary skill in the art.

What is claimed is:

1. A method of allocating exchange identifications (IDs) in a fibre channel switch for fibre channel aggregation, comprising:
   determining a number (m) of back-end N_ports present in a back end of the fibre channel switch;
   limiting a number of exchange IDs that the back-end N_ports are configured to open, such that a corresponding total number of aggregated exchange IDs associated with a front-end N_port of the fibre channel switch does not exceed a limit of exchange IDs allocated by the front-end N_port, the limit of exchange IDs in compliance with a fibre channel standard;
   distributing the exchange IDs across the number (m) of present back-end N_ports; and
   replacing exchange IDs of frames associated with the back-end N_ports.

2. The method of claim 1, wherein (n) most significant bits of each distributed exchange ID are used to identify a particular one of the back-end N_ports, and wherein a remaining number (j–n) bits represent a consecutive range of exchange IDs.

3. An apparatus for allocating exchange identifications (IDs) in a fibre channel switch for fibre channel aggregation, comprising:
   a module configured to determine a number (m) of back-end N_ports present in a back end of the fibre channel switch; a module configured to limit a number of exchange IDs that the back-end N_ports are configured to open, such that a corresponding total number of aggregated exchange IDs associated with a front-end N_port of the fibre channel switch does not exceed a limit of exchange IDs allocated by the front-end N-port, the limit of exchange IDs in compliance with a fibre channel standard;
   a module configured to distribute the exchange IDs across the number (m) of present back-end N_ports; and
   a module configured to replace exchange IDs of frames associated with the back-end N-ports.

4. The apparatus of claim 3, wherein (n) most significant bits of each distributed exchange ID are used to identify a particular one of the back-end N_ports, and wherein a remaining number (j–n) bits represent a consecutive range of exchange IDs.

5. A non-transitory tangible computer readable storage medium carrying one or more sequences of one or more instructions for execution by one or more processors to allocate exchange identifications (IDs) in a fibre channel switch for fibre channel aggregation, the instructions when executed by the one or more processors causing the one or more processors to:
   determine a number (m) of back-end N_ports present in a back end of the fibre channel switch;
   limit a number of exchange IDs that the back-end N-ports are configured to open, such that a corresponding total number of aggregated exchange IDs associated with a front-end N_port of the fibre channel switch does not exceed a limit of exchange IDs allocated by the front-end N-port, the limit of exchange IDs in compliance with a fibre channel standard;
   distribute the exchange IDs across the number (m) of present back-end N_ports; and
   replace exchange IDs of frames associated with the back-end N_ports.

6. The non-transitory tangible computer readable storage medium of claim 5, wherein (n) most significant bits of each distributed exchange ID are used to identify a particular one of the back-end N_ports, and wherein a remaining number (j–n) bits represent a consecutive range of exchange IDs.

7. The method of claim 1, wherein distributing the exchange IDs allocates exchange IDs unevenly to favor selected back-end N_ports.

8. The apparatus of claim 3, wherein the module configured to distribute the exchange IDs allocates exchange IDs unevenly to favor selected back-end N_ports.

9. The non-transitory tangible computer readable storage medium of claim 5, wherein causing the one or more processors to distribute the exchange IDs allocates exchange IDs unevenly to favor selected back-end N_ports.

10. The method of claim 1, further comprising: modifying, by an exchange manager, frames that are included in aggregated traffic associated with the back-end N_ports.

11. The apparatus of claim 3, further comprising: an exchange manager configured to modify frames that are included in aggregated traffic associated with the back-end N_ports.

12. The non-transitory tangible computer readable storage medium of claim 5, wherein the instructions further cause the one or more processors to:
modify, by an exchange manager, frames that are included in aggregated traffic associated with the back-end N_ports.

13. The method of claim 1, further comprising: replacing at least one of a source identifier (SID), destination identifier (DID), originator exchange identifier (OX_ID), responder exchange identifier (RX_ID), and sequence identifier (SEQ_ID) of at least one of the frames associated with the back-end N_ports.

14. The apparatus of claim 3, further comprising: a module configured to replace at least one of a source identifier (SID), destination identifier (DID), originator exchange identifier (OX_ID), responder exchange identifier (RX_ID), and sequence identifier (SEQ_ID) of at least one of the frames associated with the back-end N_ports.

15. The non-transitory tangible computer readable storage medium of claim 5, wherein the instructions further cause the one or more processors to: replace at least one of a source identifier (SID), destination identifier (DID), originator exchange identifier (OX_ID), responder exchange identifier (RX_ID), and sequence identifier (SEQ_ID) of at least one of the frames associated with the back-end N_ports.

16. The method of claim 1, further comprising: storing information regarding the replaced exchanged IDs in a table in memory; and tracking subsequent frames for an exchange using the table.

17. The apparatus of claim 3, further comprising: a module configured to: store information regarding the replaced exchanged IDs in a table in memory, and track subsequent frames for an exchange using the table.

18. The non-transitory tangible computer readable storage medium of claim 5, wherein the instructions farther cause the one or more processors to: store information regarding the replaced exchanged IDs in a table in memory; and track subsequent frames for an exchange using the table.

19. The method of claim 1, wherein the fibre channel standard is the fibre channel FC-FS-2 standard.

20. The apparatus of claim 3, wherein the fibre channel standard is the fibre channel FC-FS-2 standard.

* * * * *

UNITED STATES PATENT AND TRADEMARK OFFICE
CERTIFICATE OF CORRECTION

PATENT NO. : 8,625,623 B2  
APPLICATION NO. : 13/021514  
DATED : January 7, 2014  
INVENTOR(S) : Saklecha et al.

Page 1 of 1

It is certified that error appears in the above-identified patent and that said Letters Patent is hereby corrected as shown below:

In the Claims

Column 12, Line 33, replace "N-port" with --N_port--.

Column 12, Line 39, replace "N-ports" with --N_ports--.

Column 12, Line 54, replace "N-ports" with --N_ports--.

Column 12, Line 59, replace "N-port" with --N_port--.

Column 14, Line 23, replace "farther" with --further--.

Signed and Sealed this  
Second Day of September, 2014

Michelle K. Lee  
*Deputy Director of the United States Patent and Trademark Office*